Feb. 26, 1963 F. J. SPENCER 3,079,558

SQUELCH CIRCUIT

Filed Dec. 5, 1960 2 Sheets-Sheet 1

INVENTOR.
FRED J. SPENCER
BY Moody and Phillips
ATTORNEYS

INVENTOR.
FRED J. SPENCER
BY Moody and Phillips
ATTORNEYS

United States Patent Office 3,079,558
Patented Feb. 26, 1963

3,079,558
SQUELCH CIRCUIT

Fred J. Spencer, Richardson, Tex., assignor to Collins Radio Company, Cedar Rapids, Iowa, a corporation of Iowa Filed Dec. 5, 1960, Ser. No. 73,900
10 Claims. (Cl. 325—348)

This invention relates generally to squelch circuits and, more specifically, to squelch circuits for frequency modulation type receivers.

There are in the prior art many different types of squelch circuits which are designated for various applications. Some of these squelch circuits function to blank the receiver when the noise signal exceeds a certain level. Other squelch circuits operate in response to the level of signal-to-noise ratio. When the signal-to-noise ratio decreases to a point where the signal is no longer intelligible the squelch circuit will function to blank the receiver until the signal-to-noise ratio again increases to a point where the received signal becomes intelligible, at which time the receiver becomes unblanked. In all known systems, however, there is an area between the blanking of the receiver and unblanking of the receiver where some of the intelligible signal is lost. More specifically, for example, as the level of the signal-to-noise ratio of the received signal decreases, a point will be reached where the squelch circuit will function to blank the receiver. Now, in order for the receiver to become operative again, i.e., unblanked, it is necessary that the signal-to-noise ratio be increased to a value greater than the first (blanking) signal-to-noise ratio. It is apparent that the intelligence carried by the R.F. signal between the level of the blanking signal-to-noise ratio and the level of the unblanking signal-to-noise ratio, will be lost to the receiver. Consequently, it is desirable to make the unblanking level of signal-to-noise ratio and the blanking level of signal-to-noise ratio as nearly coincidental as possible.

In F.M. receivers it is a characteristic thereof that the noise power will decrease with an increasing R.F. signal. Consequently, in an F.M. receiver a squelch circuit can be designed which is a function of noise power. In prior art circuits such a squelching function is effected by first extracting the noise signal from the received signal. Since the magnitude of said noise signal will increase as the signal strength decreases, a blanking circuit, such as a Schmitt trigger circuit, can be made to blank the circuit when the noise level increases to a certain magnitude. On the other hand, as the R.F. signal increases in amplitude and the noise level decreases, a point will be reached where the Schmitt trigger circuit will function to unblank the receiver circuit. There is, however, as indicated above, an area between the noise level at which blanking occurs and the noise level at which unblanking occurs wherein the intelligence-carrying R.F. signal is not utilized. It will be apparent that less intelligence bearing R.F. signal will be lost if a greater change in noise level can be made to occur for a given change in the R.F. level.

It is an object of this invention to minimize the amount of intelligence bearing R.F. signal lost in the operation of a squelch circuit.

A further object of the invention is the improvement of squelch circuits, generally.

In accordance with the invention there is provided in an F.M. receiver, means for extracting the noise signal from the received signal, a blanking circuit responsive to said extracted noise, and circuit means connected substantially in parallel with said blanking circuit and which provides an impedance whose magnitude decreases as the signal-to-noise ratio increases; thus diverting an ever increasing portion of the noise signal from the blanking circuit as the R.F. power increases, and thereby creating a large incremental change in noise power for a given incremental change in R.F. power. The variable impedance circuit means comprises a transistor connected from the output of the noise extracting circuit to a reference potential (ground) through the collector-emitter circuit of said transistor. Said variable impedance circuit means also comprises rectifying means which is responsive to the received signal to produce a D.C. potential whose magnitude is proportional to the signal plus the noise power ($S+N$) and to supply such D.C. potential to the base electrode of the transistor. The aforementioned D.C. potential functions to vary the impedance of the transistor in accordance with the magnitude of said D.C. potential. As the signal-to-noise ratio increases the signal plus noise power ($S+N$) will increase and the impedance of the transistor will decrease, thus diverting an increasing amount of noise signal therethrough. Thus it can be seen that the effect of the changing impedance of the transistor is to provide a greater incremental change in noise signal (N) for a given incremental change in the signal-plus-noise ($S+N$), than would be the case in the absence of the present invention. Worded in another manner, the effect of the invention is to increase the change in the ratio $S+N/N$ as $S+N$ increases.

The above mentioned and other objects and features of the invention will be more fully understood from the following detailed description thereof when read in conjunction with the drawings in which.

Figures 1, 2, 4:
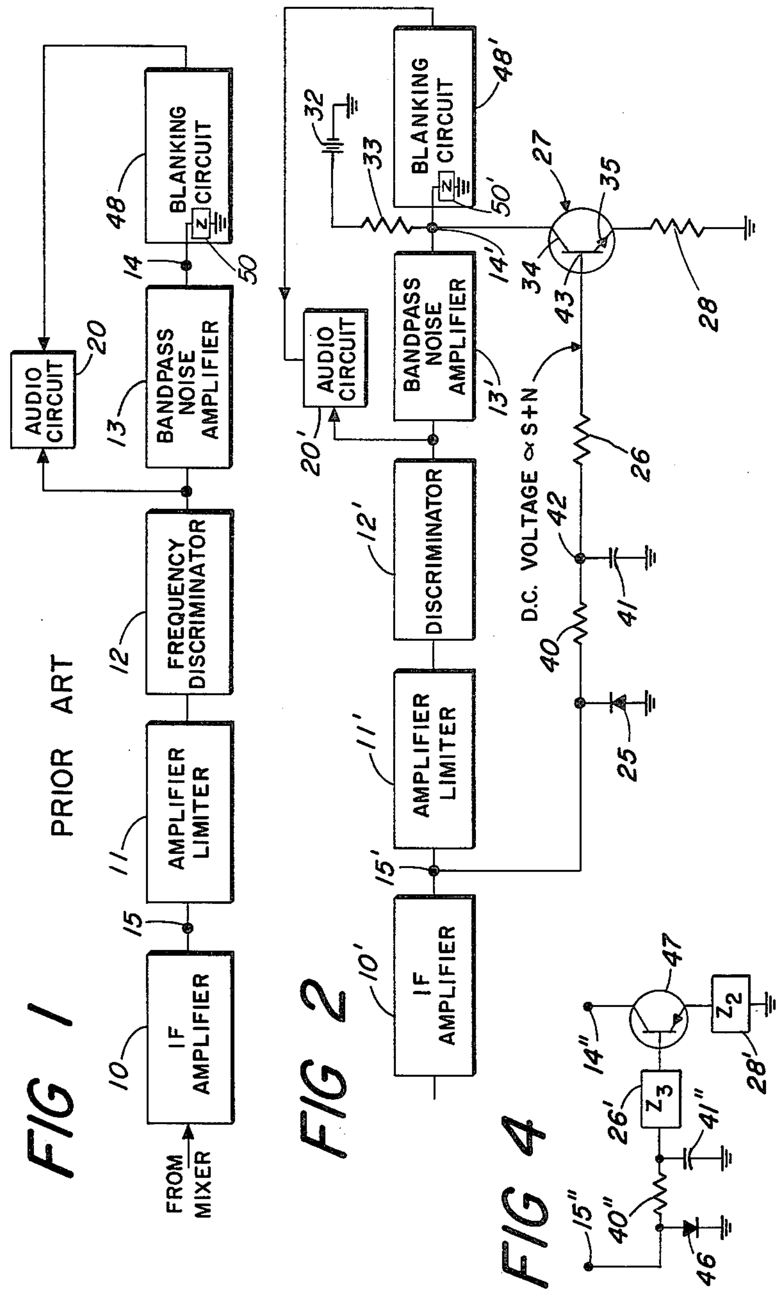
FIG. 1 shows a block diagram of prior art structure.
FIG. 2 shows a combination block diagram and schematic sketch of the invention as applied to prior art structure.
FIG. 4 shows a schematic sketch of an alternative form of the invention.

Referring now to FIG. 1, there is shown a portion of an F.M. receiver. The output of I.F. amplifier 10 is supplied to an amplifier limiter circuit 11 which amplifies the received signal, including noise, and supplies the output thereof to the discriminator 12. The discriminator 12 functions to extract the audio signal from the received signal in a well-known manner. Also, the discriminator passes noise. The output of the discriminator 12 is supplied not only to the audio circuit 20 but also to the bandpass noise amplifier 13 which functions to pass and to amplify the noise appearing in a given frequency bandwidth usually lying near the edge of, or just outside, the bandwidth carrying the intelligence. The use of a noise-carrying bandwidth outside the intelligence bearing frequency bandwidth is permissible since the noise level in both frequency bandwidths is very likely to be about the same. The output signal of the bandpass noise amplifier 13 is supplied to a suitable switching circuit, such as a Schmitt trigger 48 circuit which, in turn, functions in a conventional manner either to blank or to unblank the receiver, depending upon the noise level. The blocks 50 and 50' contained within the blanking circuits 48 and 48' of FIGS. 1 and 2, respectively, represent the input impedances of said blanking circuits.

Figure 3:
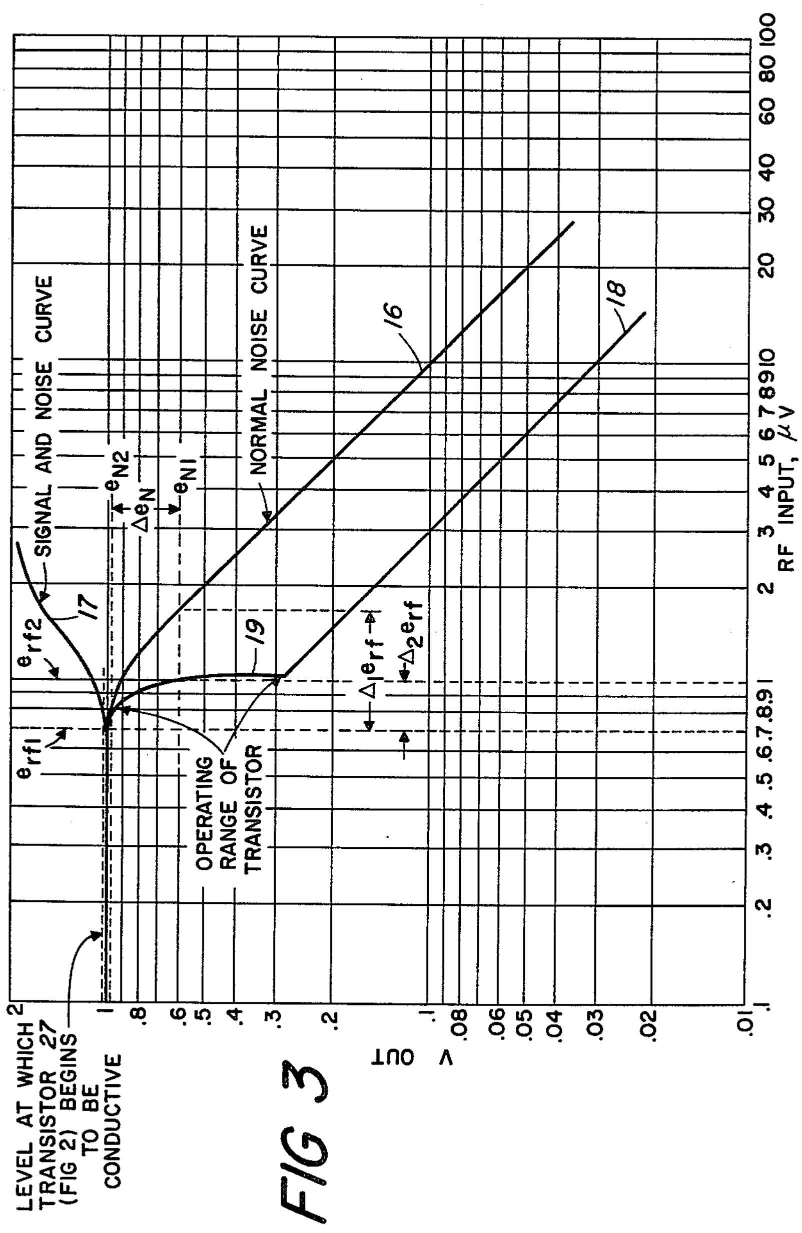
FIG. 3 shows characteristic operating curves of noise power and signal plus noise power as the R.F. signal strength varies.

Referring now to the curves of FIG. 3, the curve 16 shows the variation of noise level in volts which appears at the output terminal 15 of the bandpass noise amplifier 13 of FIG. 1 with variation in R.F. strength, and the curve 17 represents the variation of the magnitude of the signal plus noise in volts appearing at the output 15 of the amplifier 10 of FIG. 1 with variation in R.F. strength. From an examination of curves 16 and 17 it will be apparent that the noise portion of the received signal comprises substantially all of the received signal until the R.F. portion of the received signal attains a value of about .7 microvolt; at which time the noise generated in the receiver begins to decrease sharply, thus permitting an increasingly greater incremental change in noise as the signal-plus-noise $(S+N)$ increases. As discussed hereinbefore, such incremental change in noise level is employed to operate an appropriate circuit such as a Schmitt trigger circuit which, in turn, functions to blank or unblank the receiver.

The noise level at which the circuit becomes unblanked is designated as $e_{n1}$, and the noise level at which the receiver circuit becomes blanked is designated as $e_{n2}$. The difference between $e_{n1}$ and $e_{n2}$ is designated as $\Delta e_n$ and represents the differential noise voltage required to operate the Schmitt trigger circuit. An examination of FIG. 3 will show that the change in R.F. power required to produce the differential noise voltage equal to $\Delta e_n$ is $\Delta_1 e_{rf}$. In more specific terms, it is required that the R.F. power increase to a magnitude of about 1.7 microvolts before the Schmitt trigger circuit will operate to unblank the circuit (assuming the receiver was in a blanked condition originally). Then, to blank the receiver, the R.F. voltage must decrease to a magnitude of about .7 microvolt. The difference between .7 and 1.7 microvolts represents a loss of intelligible signal covering an R.F. range of 1 microvolt. It is, perhaps, appropriate to point out at this time that the principal object of this invention is to reduce, as much as possible, this 1 microvolt range of R.F. signal which is lost to the receiver.

The curve 18 of FIG. 3 shows a modified noise characteristic curve in which the noise voltage tolerance $\Delta e_n$ is obtained with an incremental difference of R.F. voltage equal to about .30 microvolt, which is represented by the voltage $\Delta_2 e_{rf}$ in FIG. 3.

The circuit means by which the modified noise characteristic curve 18 is obtained comprises the subject of this invention and is shown in FIG. 2. Such circuitry is comprised of rectifier 25, an integrating circuit including resistor 40 and capacitor 41, current limiting impedance 26, transistor 27, and impedance 28. A voltage source 32 supplies collector voltage to the transistor 27 through impedance 33. Blocks 10′, 48′, 11′, 12′, 13′, and 20′ correspond to the blocks similarly identified (without primes) in FIG. 1.

In FIG. 2 the collector electrode 34 of transistor 27 is connected to the output of the bandpass noise amplifier 13 and the emitter electrode 35 is connected to ground potential through impedance 28, which can be a resistor.

Rectifier 25 has its cathode connected to the output terminal 15′ of I.F. amplifier 10′ and will produce, at point 42, in cooperation with the integrator circuit comprised of resistor 40 and capacitor 41, a D.C. voltage whose magnitude varies proportionally as the signal-plus-noise $(S+N)$. The signal-plus-noise voltage is represented by the curve 17 of FIG. 3. The said D.C. voltage is supplied through the current limiting impedance 26 to the base electrode 43 of the transistor 27.

The D.C. voltage supplied to the base electrode 43 of transistor 27 will function to change the conductivity of the transistor 27 in proportion to the magnitude thereof. Referring now to the curve 17 of FIG. 3, it can be seen that if the R.F. input increases beyond a magnitude of about .7 microvolt the signal-plus-noise level begins to increase rapidly and, concurrently, the conductivity of the transistor 27 will become increasingly greater. Also, concurrently, the amplitude of the noise signal will be decreasing as indicated hereinbefore. However, due to the fact that the conductivity of the transistor 27 is increasing, an ever increasing amount of the noise signal will be diverted from point 14′ through the transistor 27 and impedance 28 to ground potential. The resulting noise signal characteristics appearing at terminal 14′ is represented by the portion 19 of curve 18 of FIG. 3. It will be observed that the rate of change of the amplitude of the noise signal of the portion 19 of curve 18 during said interval is considerably greater than the rate of change of the corresponding portion of noise curve 16, said last-mentioned curve representing the operation of the circuit in the absence of transistor 27 and its associated circuitry. It can be seen, consequently, that the necessary differential noise signal $\Delta e_n$ required for blanking and unblanking the circuit is obtained with considerably less loss of R.F. signal.

Referring now to FIG. 4, there is shown an alternative form of the invention in which elements which have corresponding counterparts in FIG. 1 and FIG. 2 are identified with the same reference characters (although primed). To avoid repetition, the entire circuit of FIG. 2 is not reproduced in FIG. 4, but only that portion of the circuit between the junctions 15′ and 14′.

The principal difference is the structure of FIG. 4 is that a PNP type transistor is employed, whereas in the structure of FIG. 2 an NPN type transistor is employed. In accordance with the use of a PNP type transistor in FIG. 4 the diode 46 is connected with a polarity reverse to that of diode 25 of FIG. 2. Thus, a negative D.C. votlage will be produced at the base electrode of the transistor 47 to control its conductivity. More specifically, as the R.F. signal strength increases the signal-plus-noise voltage of curve 17 of FIG. 3 will increase and the negative D.C. votlage supplied to the base electrode of transistor 47 will increase, whereby the conductivity of transistor 47 will increase. The increased conductivity of transistor 47 will function to divert an increasing amount of the noise signal from the output terminal 14″ of the bandpass noise amplifier. It is to be understood that the portion of the circuit of FIG. 2 not shown in FIG. 4, is a part of the circuit of FIG. 4.

It is to be noted that the forms of the invention shown and described herein are but preferred embodiments thereof and that various changes may be made in the circuit arrangements and the application thereof without departing from the spirit or the scope of the invention.

I claim:

1. In a radio receiver comprising means for receiving a signal containing an intelligence bearing signal and noise signal, means for extracting from the received signal a direct current signal whose magnitude varies proportionately with the average power of the received intelligence bearing signal-plus-noise signal, means for extracting the noise signal from said received signal, blanking means having an input means and constructed to be responsive to said extracted noise signal for blanking said radio receiver when the amplitude of said noise signal exceeds a predetermined level, and diverting means comprising a variable impedance and connected in parallel with input means of said blanking means, said variable impedance constructed to be responsive to said direct current signal to divert from said blanking signal a portion of said extracted noise signal, which portion varies in accordance with the magnitude of said direct current signal.

2. A radio receiver in accordance with claim 1 in which said variable impedance comprises an electron valve having an electron emitting electrode, an electron collecting electrode, and an electron control electrode, in which said diverting means comprises impedance means connected in series arrangement with the electron emitting electrode-electron collecting electrode circuit of said electron valve to form the parallel circuit with the input means of said blanking means, and means for supplying said direct current signal to said electron control electrode to control the electron collecting electrode-electron emitting electrode circuit impedance of said electron valve.

3. A radio receiver in accordance with claim 2 in which said means for extracting said direct current signal from the received signal comprises rectifying means to detect the received signal and integrating means constructed to be responsive to said detected signal to produce said direct current signal.

4. A radio receiver in accordance with claim 3 in which said electron valve is a PNP type transistor, and in which said rectifying means is constructed to produce a negative direct current voltage with respect to the potential of said electron emitting electrode.

5. A radio receiver in accordance with claim 3 in which said electron valve is an NPN type transistor, and in which said rectifying means is constructed to produce a positive direct current voltage with respect to the potential of said electron emitting electrode.

6. A frequency modulation type radio receiver comprising means for receiving a signal containing an intelligence bearing signal and noise signal, means for extracting from the received signal a direct current signal whose magnitude varies proportionately with the average power of the received intelligence bearing signal plus the noise signal, first means including a bandpass amplifier for extracting noise signal from said received signal, blanking means including an input means and constructed to be responsive to said extracted noise signal for blanking said radio receiver when the amplitude of said noise signal exceeds a predetermined level, and diverting means having a part thereof including a variable impedance connected in parallel with the input means of said blanking means, said variable impedance constructed to be responsive to said direct current signal to divert from said blanking signal a portion of said extracted noise signal, which portion varies in accordance with the magnitude of said direct current signal.

7. A radio receiver in accordance with claim 6 in which said variable impedance comprises an electron valve having an electron emitting electrode, an electron collecting electrode, and an electron control electrode, and means for supplying said direct current signal to said electron control electrode to control the electron collecting electrode-electron emitting electrode circuit impedance of said electron valve.

8. A radio receiver in accordance with claim 7 in which said means for extracting said direct current signal from the received signal comprises rectifying means to detect the received signal and integrating means constructed to be responsive to said detected signal to produce said direct current signal.

9. A radio receiver in accordance with claim 8 in which said electron valve is a PNP type transistor, and in which said rectifying means is constructed to produce a negative direct current voltage with respect to the potential of said electron emitting electrode.

10. A radio receiver in accordance with claim 8 in which said electron valve is an NPN type transistor, and in which said rectifying means is constructed to produce a positive direct current voltage with respect to the potential of said electron emitting electrode.

References Cited in the file of this patent

UNITED STATES PATENTS

| | | |
|---|---|---|
| 2,425,968 | Tunick | Aug. 19, 1947 |
| 2,632,101 | Quarles | Mar. 17, 1953 |
| 2,704,324 | Broadhead | Mar. 15, 1955 |